United States Patent
Ephraim, Jr. et al.

[15] 3,691,446
[45] Sept. 12, 1972

[54] TRACTION MOTOR TEMPERATURE CONTROL OF LOCOMOTIVE POWER

[72] Inventors: Max Ephraim, Jr., Evergreen Park; Earl D. Smith, Naperville, both of Ill.

[73] Assignee: General Motors Corporation, Detroit, Mich.

[22] Filed: June 30, 1971

[21] Appl. No.: 158,470

Related U.S. Application Data

[62] Division of Ser. No. 26,861, April 9, 1970.

[52] U.S. Cl. ............... 318/472, 73/362 AR, 219/504, 219/505
[51] Int. Cl. ............................................. H02p 5/22
[58] Field of Search ...... 318/472, 471; 219/504, 505; 73/362 AR

[56] References Cited

UNITED STATES PATENTS

| | | |
|---|---|---|
| 2,629,848 | 2/1953 | Charlton ............... 318/472 X |
| 3,474,963 | 10/1969 | Buiting et al ........... 219/505 X |
| 3,573,585 | 4/1971 | Taylor ................... 318/472 X |

*Primary Examiner*—Benjamin Dobeck
*Attorney*—E. W. Christen et al.

[57] ABSTRACT

A system for controlling the power output of the generator of a locomotive as a function of the temperature of the traction motors connected to the generator. The system utilizes an electrical heater element connected in series with at least one traction motor and the heater generates an amount of heat which is a function of the amount of current being supplied to the traction motor. The heater element forms part of a simulator such that the temperature developed by it simulates the operating temperature of the traction motor for a given traction motor current. A temperature sensitive resistance element senses the temperature of the simulator and is connected with a control circuit so as to vary the excitation and output power of the generator as a function of the temperature sensed by the resistance element. The simulator and traction motors are arranged such that they both are at substantially the same ambient temperature.

1 Claim, 5 Drawing Figures

INVENTORS
Max Ephraim, Jr. &
Earl D. Smith
BY
C. R. Meland
ATTORNEY

INVENTORS
Max Ephraim, Jr. &
BY   Earl D. Smith
C.L. Meland
ATTORNEY

TRACTION MOTOR TEMPERATURE CONTROL OF LOCOMOTIVE POWER

This application is a division of application Ser. No. 26,861, filed on Apr. 9, 1970.

This invention relates to a power control system for controlling the power output of a locomotive traction motor generator which supplies traction motors and to a system wherein the output voltage of the generator is controlled by a device which simulates traction motor temperature.

When operating a locomotive that utilizes an engine driven generator that supplies current to a plurality of traction motors the power output of the generator is controlled such that the traction motors will not become overheated particularly during low speed operation of the traction motors for example when the locomotive is moving up a rather long grade. The systems that have been used for controlling the output power of the generator have been controlled as a function of the speed of a traction motor. This means that whether the locomotive is moving up a short grade or relatively long grade the output power to the traction motor will be limited with prior art systems when the speed of the traction motor drops to a certain value so as to ensure that the traction motors will not be overheated.

It will be appreciated that where power output is controlled as a function of traction motor speed there will be conditions of operation where the motor could actually be operated at a higher current level than that dictated by a speed responsive system with the result that the locomotive system is not at all times operating at its highest possible power level.

In contrast to systems that control power output of the generator as a function of traction motor speed it is an object of this invention to provide a system for controlling the power output of the generator as a function of traction motor temperature whereby limiting does not take place until the temperature of the traction motor reaches a level where continued operation at this temperature might harm the traction motor. In carrying this object forward an electrical heating element is connected in series with a traction motor and is arranged such that the temperature the heater element attains is a function of traction motor current and also simulates traction motor temperature for a given traction motor current.

It accordingly is another object of this invention to provide a locomotive traction motor power supply system wherein the excitation of the main power generator is controlled as a function of the heat generated by a heater element that is connected in series with a traction motor but which is located outside of the traction motor. With this arrangement the difficulties of actually physically placing a device in the traction motor to sense a temperature of a part of the traction motor is eliminated as is the likelihood of damage to the sensing device from debris and other elements encountered by traction motors during railroad use.

Still another object of this invention is to provide a power control system for a locomotive wherein a heater element is connected in series with the traction motor and wherein the heater element forms part of a simulator that develops a temperature which simulates the operating temperature of the traction motor as a function of current supplied to the traction motor and further wherein a temperature sensitive resistance senses the temperature of the simulator and is coupled to a control circuit that controls the excitation of the main power generator.

Figure 1:
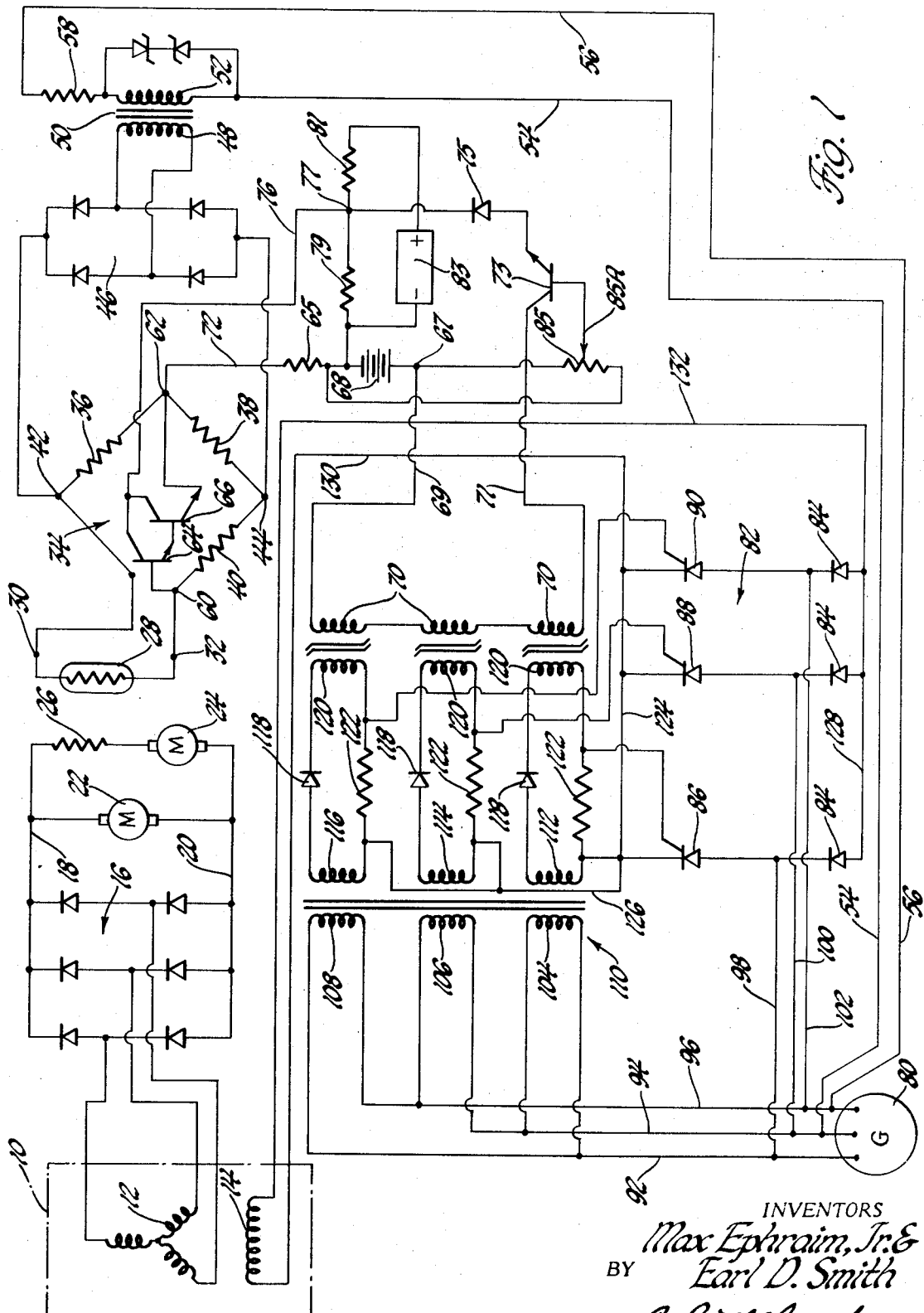
FIG. 1 is a schematic circuit diagram of a locomotive power control system made in accordance with this invention.

Referring now to the drawings and more particularly to FIG. 1, the reference numeral 10 designates a main power supply generator for the traction motors of a locomotive. The generator 10 is an alternating current generator having a three phase Y-connected stator winding 12 and a field winding 14 which may be mounted on the rotor of the generator. The rotor is driven by an engine which is not illustrated. The output voltage of the stator winding 12 is applied to a three phase full-wave bridge rectifier designated by reference numeral 16 and having direct current output terminals connected with traction motor power supply conductors 18 and 20. The power supply system can take various configurations and may include for example a number of Y-connected windings connected with a number of bridge rectifiers as is disclosed in the U.S. patent to Thiessen U.S. Pat. No. 3,340,448, issued on Sept. 5, 1967. The direct current power supply conductors 18 and 20 supply conventional direct current series traction motors 22 and 24 which are shown connected in parallel across the power supply conductors 18 and 20. The armatures of the traction motors are, of course, coupled to the wheels of the locomotive in a conventional manner which is not illustrated.

The traction motor 24 is connected in series with an electrical heating element designated by reference numeral 26. This heating element is described in detail hereinafter it being pointed out, however, that this heating element generates heat as a function of the amount of current being supplied to the traction motor 24. As will be described hereinafter the heating element 26 together with its mounting provide a temperature simulator which simulates the actual operating temperature within the traction motor 24 and particularly simulates the temperature of the series field of this motor.

The temperature of the heating element 26 is sensed and is utilized to control the excitation of the field winding 14 of the main power generator 10. To this end a temperature sensitive resistance designated by reference numeral 28 is positioned to sense the temperature of the simulator including heater element 26 and to thereby vary the resistance across its terminals 30 and 32 as a function of the temperature sensed. This resistance element has a positive temperature coefficient of resistance and its physical construction is fully described hereinafter.

In order to control the excitation of the field winding 14 of the main power generator 10 as a function of the temperature of the heater element 26 the temperature sensitive resistance 28 is coupled to a control system which will now be described for varying field excitation. It is seen that the temperature sensitive resistance 28 forms part of a Wheatstone bridge designated by reference numeral 34 which also includes resistors 36, and 38 and 40. The input terminals 42 and 44 of the bridge are connected with a source of direct current which in this case takes the form of a single phase bridge rectifier 46 connected with the secondary winding 48 of a transformer 50. The primary winding 52 of the transformer is connected across power supply conductors 54 and 56 fed from a single phase source of alternating current as described hereinafter. The primary winding 52 is connected in series with a resistor 58 and a pair of Zener diodes are connected across the primary winding 52 as illustrated in FIG. 1 to provide some voltage regulation.

The output terminals 60 and 62 of the Wheatstone bridge are connected with the base-emitter circuits of transistors 64 and 66 which are connected in a Darlington configuration. The output terminal 62 of the Wheatstone bridge 34 is connected with a conductor 72. The conductor 72 is connected with the negative side of a source of direct current 68 through a resistor 65. The positive side of the source of direct current is connected with a junction 67 which in turn is connected with a conductor 69. The conductor 69 is connected to one side of series connected direct current control or sensor windings 70 of a magnetic amplifier to be described hereinafter. The opposite sides of the control windings 70 are connected with a conductor 71 which in turn is connected to the collector of an NPN transistor designated by reference numeral 73. The emitter of transistor 73 is connected with a diode 75 and the cathode of this diode is connected to junction 77 and to conductor 76 which is connected to the collectors of transistors 64 and 66. It therefore is seen that the collector-emitter circuit of transistor 66 and resistor 65 are connected in series across conductors 76 and 72 and therefore in parallel with a resistor 79. The junction 77 is located between resistors 79 and 81 and these resistors are connected in series across a direct voltage source designated by reference numeral 83. The direct voltage source 83 preferably takes the form of a bridge rectifier (not illustrated) which receives alternating current from current transformers, not illustrated, including windings that sense the current in the conductors connecting the output winding 12 of the generator with the bridge rectifier 16. Such current transformers are well known to those skilled in the art and it therefore will be understood that the direct voltage source 83 develops a direct voltage the magnitude of which is a function of the current flowing in the conductors supplying the bridge rectifier 16. This provides a current feedback voltage which is known to those skilled in the art and this feedback voltage develops a potential at junction 77 to thereby control the potential of the emitter of transistor 73.

The base of transistor 73 is connected with a rheostat designated by reference numeral 85 and connected across the direct current source 68. The adjustable slider or arm 85A of the rheostat 85 is controlled by a load regulator which adjusts the arm 85A in accordance with the setting of an engine governor (not illustrated) as is known to those skilled in the art to adjust the power output of a locomotive system. As is known to those skilled in the art the adjustment of the load regulator rheostat 85 by an engine governor sets the output power level for the generator 10.

It will be appreciated that the amount of current supplied to the control windings 70 of the magnetic amplifier will be a function of the conductance of transistor 73 in its collector-emitter current. The conductive or non-conductive mode of transistor 73 depends upon the relative base to emitter voltage with the base voltage being set by the load regulator. The emitter voltage of transistor 73 is controlled as a function of the feedback voltage 83 and also as a function of the conduction of transistors 64 and 66. Thus, when transistors 64 and 66 are conducting, as when the temperature sensed by resistor 28 is below a predetermined value, the resistor 65 is connected in parallel with resistor 79. The values of the resistors are so proportioned that when transistors 64 and 66 conduct the potential at junction 77 is reduced with the result that more current can be supplied to the magnetic amplifier coils 70 through transistor 73 and with the further result that the power output of the generator 10 can be increased. This means that when the temperature developed by the temperature simulator, including the heater 26, is below a limiting value the excitation of the generator 10 can be increased to a certain value.

When the temperature sensed by resistor 28 reaches the limiting value the transistors 64 and 66 are biased nonconductive with the result that resistor 79 controls the excitation level of the generator and limits it to some value determined by the current feedback and setting of load regulator rheostat 85. Over a predetermined range of temperatures, however, and up to the limiting temperature the temperature sensitive resistor is continuously controlling the excitation of the generator 10 and permitting it to be excited at a maximum current for a given temperature. The transistors 64 and 66 operate in a modulating mode during variation of temperature over a predetermined temperature range. It should be further pointed out that resistors 36, 38 and 40 of the Wheatstone bridge have equal resistance valves and the resistance of one of these resistors is equal to the resistance of circuit element 28 when it has a predetermined temperature.

The amount of direct current applied to the DC control winding 70 controls the excitation of the field winding 14 of the main power generator 10. To this end the system includes a three phase auxiliary generator designated by reference numeral 80 which feeds a three phase full-wave bridge designated by reference numeral 82 and comprised of three diodes 84 and three controlled rectifiers 86, 88 and 90. The power supply conductors 92, 94 96 supply the bridge rectifier through conductors 98, 100 and 102 and also supply three phase power to the primary windings 104, 106 and 108 of a transformer 110. Conductors 94 and 96 are connected to conductors 54 and 56 and therefore apply single phase power to these conductors. The secondary windings of the transformer 110 are designated by reference numerals 112, 114, and 116. Each secondary winding is connected in series with a diode 118, a saturable reactor coil 120 and a resistor 122. The reactor coils 120 form part of a magnetic amplifier the saturation of which is controlled by direct current supplied to the direct current coils 70 of the magnetic amplifier. These saturable or magnetic amplifiers preferably have DC bias windings which, for purposes of this invention, have not been illustrated.

It is seen that the respective gate electrodes of controlled rectifiers 86, 88 and 90 are coupled to one side of the resistors 122 whereas the cathodes of these controlled rectifiers are all connected to conductor 124 and to an opposite side of the resistors 122 via a conductor 126 connected to conductor 124.

The conductors 124 and 128 of the bridge 82 supply direct current to the field winding 14 of the main power generator 10 through conductors 130 and 132. The firing angle of the controlled rectifiers 86, 88 and 90 is controlled by the magnetic amplifier whereby the direct current supplied to field winding 14 is controlled as a function of bias current in control windings 70 of the magnetic amplifier and the magnitude of this current is a function of the resistance of the temperature sensitive resistance element 28. In this regard it is pointed out that the reactor coils 120 of the magnetic amplifier will saturate at some predetermined value of direct current applied to control coils 70. As the current through the control or sensor coils 70 is increased the reactors saturate earlier in the cycle of applied alternating current. When the reactor coils 120 saturate their impedance drops with the result that the voltage across resistors 122 increases to a value which is sufficient to gate the controlled rectifiers 86, 88 and 90 conductive. It therefore will be appreciated that as the resistance of temperature sensitive resistor 28 decreases from a predetermined value the magnetic amplifier is saturated earlier in the cycle of applied voltage with the ultimate result that more current can be supplied to field winding 14. When the temperature sensed by resistor 28 reaches a predetermined value to bias transistors 64 and 66 and a lower resistance value corresponding to a lower simulated traction motor temperature, the conduction of transistors 64 and 66 is modulated to therefore apply a bias to transistor 73 to smoothly vary the excitation of field winding 14 over a predetermined range of temperatures. It is pointed out that the phase relationship of the voltages on conductors 92, 94 and 96, the polarities of the transformers, and the connection of the phases of generator 80 with the bridge 82 are all arranged so that the signal voltage applied to the gates of the controlled rectifiers is in phase with the voltages applied to the bridge by conductors 98, 100 and 102. This means that the firing angle of the controlled rectifiers is controlled by the firing angle of the saturable reactor coils 120 to provide accurate control of the current supplied to field winding 14. It will, of course, be appreciated that the controlled rectifiers 86, 88 and 90 are commutated by the alternating output voltage of generator 80.

Although a specific control circuit, including transistors 64, 66 and 73, has been described together with the magnetic amplifier and the bridge 82 for regulating the field current of field winding 14 it will be appreciated that other control systems could be utilized as long as the field current is controlled over a predetermined temperature range of the simulator by the temperature sensitive resistance 28. It should be further appreciated that the control transistor 73 is controlled by a number of parameters in the system other than the simulated temperature of a traction motor.

Figure 2:
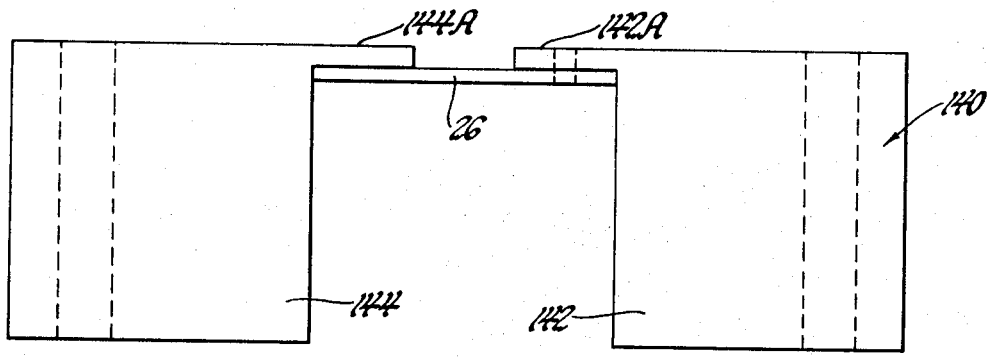
FIG. 2 is a plan view of a motor temperature simulator which forms a component part of the power control system of this invention.

Referring now to FIG. 2, the physical construction of the motor temperature simulator, which includes the resistance element 26 will now be described. As seen in FIG. 2 the motor temperature simulator which is generally designated by reference numeral 140 comprises two blocks 142 and 144 which are formed of copper. Each block has a ledge portion 142A and 144A to which is attached at the underside of the ledge portions the resistance heater element 26. The resistance heater element 26 is a flat elongated strip of metallic material preferably of a nickel-chromium alloy commonly known as a resistance alloy. As an example the material utilized for part 26 should have a relatively high electrical resistivity for example a resistivity of 543 ohms per square mil ft. at a temperature of 20°C. A material which is suitable for this purpose is Alleghery Ludlum Ohmaloy which has the above mentioned resistivity and a relatively low temperature coefficient of resistance. The strip, of course, operates as an electrical heating element and the amount of heat developed by the strip will be a function of the resistance of the strip and the square of the current passed therethrough. The heater strip 26 is attached to the underside of ledges 142A and 144A by silver soldering this part to the copper blocks.

The mass of the copper blocks and the amount of heat developed by the heater strip 26 are so calculated with respect to temperatures encountered in a traction motor for a given traction motor current that the temperature developed by simulator 140 closely simulates that which would be actually encountered within the traction motor and particularly the series field of the traction motor. In this regard the mass of copper blocks 142 and 144 to some extent slows down the general heating effect but the copper mass and the amount of heat generated by the heater strip 26 all provide temperature conditions which very nearly simulate the exact temperature conditions found in the traction motor. As will be further explained hereinafter the motor temperature simulator is located outside of the housing of the traction motor and preferably in an electrical equipment cabinet on the locomotive. In addition, the same air which is used to cool the traction motors is also applied to the motor temperature simulator 140 so that the traction motor and motor temperature simulator 140 are both located within the same environment temperaturewise and therefore respond to the same ambient temperature. This is more fully described hereinafter in connection with FIG. 5 which illustrates the relative positions of the traction motors and motor temperature simulator 140 on a locomotive and how air is directed to the traction motors and the motor temperature simulator.

Figure 3:
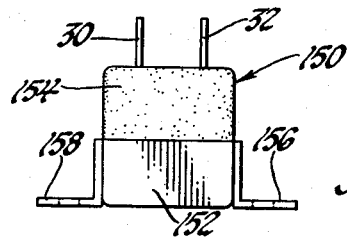
FIG. 3 is a plan view of a temperature detector which is attached to the motor temperature simulator shown in FIG. 2.

The temperature which is attained by the motor temperature simulator 140 is sensed by a temperature sensitive resistance having a positive temperature coefficient of resistance which is identified by reference numeral 28 in FIG. 1. The actual physical construction of the temperature sensing device is shown in FIG. 3. This temperature detector is generally designated by reference numeral 150 in FIG. 3 and includes an aluminum housing designated by reference numeral 152. The temperature sensitive resistance element 28 is secured but insulated from the bottom inner wall of the housing 152 which carries a plastic housing designated by reference numeral 154. The terminals 30 and 32 of the temperature detector 150, which are connected to opposite sides of resistor 28, project from the top side of the plastic housing 154 and as shown in FIG. 1 become connected with the Wheatstone bridge 34.

Figure 4:
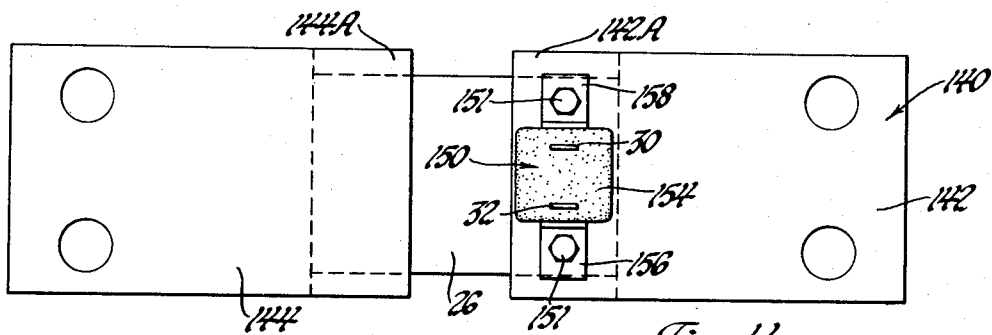
FIG. 4 is a top view of the motor temperature simulator shown in FIG. 3 with the resistance temperature detector of FIG. 3 attached thereto.

The temperature detector 150 is secured to the copper block 142 of temperature simulator 140 in a manner illustrated in FIG. 4. The temperature detector is secured to the copper block 142 by screws 151 that are threaded into the copper block 140 and which pass through openings formed in the brackets 156 and 158 of the temperature detector. The brackets 156 and 158 are secured to housing 152. The lower wall of aluminum housing 152 of the temperature detector directly contacts the top side of the ledge 142A of copper block 142. It will therefore be appreciated that heat generated by the flat heater 26 will be conducted to the temperature sensitive resistance 28 by copper block 140 and through the lower wall of aluminum housing 152 and this wall is again proportioned so that the temperature sensed by the resistor 128 closely simulates the actual temperature conditions in a traction motor for a given level of traction motor current. The mounting of the temperature detector on ledge 142A of reduced thickness has been found to give particularly accurate temperature simulation and detection.

The blocks 142 and 144 are bolted to bus-bars not illustrated which connect the simulator in series with a traction motor. These bolts pass through the holes in the blocks 142 and 144.

Figure 5:
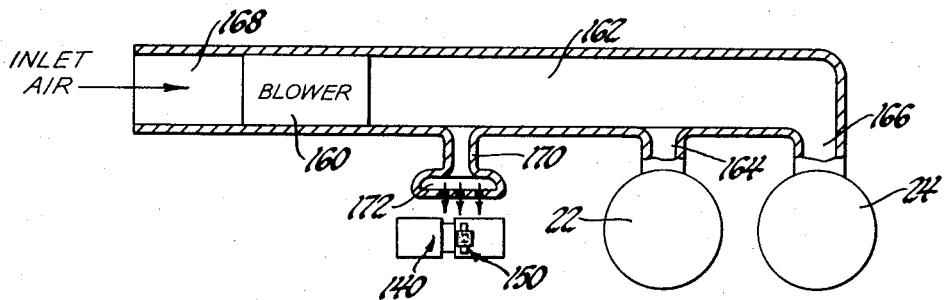
FIG. 5 illustrates a system for supplying air to the traction motors of the power supply system of this invention and to the motor temperature simulator.

As has been pointed out previously the temperature detector is not disposed within the traction motor but rather in an electrical compartment of the locomotive. FIG. 5 illustrates the remote location of the motor simulator 140 and temperature detector 150 from the traction motors 22 and 24 and also illustrates schematically the means for placing the traction motors and the temperature simulator and detector in the same temperature environment.

In FIG. 5 the reference numeral 160 designates a traction motor blower which supplies air to a duct 162 connected with ducts 164 and 166. The ducts 166 and 164 direct this air into the housings of the traction motors 22 and 24 in a conventional manner in order to cool the traction motors. The inlet side of blower 160 is connected with an inlet air duct 168 which receives air pulled into the locomotive from the exterior of the locomotive. This air is therefore at the same temperature as the outside air.

The motor temperature simulator 40 and the temperature detector 150 are located in an electrical cabinet on a locomotive which is not illustrated. The duct 162 is connected to a duct 170 which feeds a compartment 172 having orifices for directing air onto the motor temperature simulator 140 in a manner illustrated in FIG. 5. Because of this arrangement it will be appreciated that the traction motors 22 and 24 and the motor temperature simulator 140 are both subjected to air of the same temperature since the outlet side of the blower 160 feeds air to both the traction motors and the motor temperature simulator 140. This means that the traction motors and the motor temperature simulator are subjected to the same ambient temperature and the temperature sensed by the temperature sensitive resistance 28 is therefore a true indication of actual temperature conditions in the traction motors for a given traction motor current since the motor temperature simulator 140 provides substantially this same temperature.

The overall operation of the power control system of this invention will now be described. As the generator 10 supplies current to the traction motors 22 and 24 the excitation of its field winding 14 is controlled to therefore control the output power developed by the generator. This excitation can be varied by a number of factors including the load regulator rheostat 85. It will be appreciated that when a predetermined maximum temperature is attained, as sensed by temperature sensor 28, the Wheatstone bridge will be balanced with the result that transistors 64 and 66 are substantially nonconductive with the further result that excitation is limited due to the bias applied to transistor 73. The magnetic amplifier is arranged such that the conduction period of the controlled rectifiers 86, 88 and 90 increases with increasing current through the bias windings 70 and decreases as the current is reduced in these bias windings. This means that with the transistors 64 and 66 non-conductive the output voltage of the bridge 82 and consequently the field excitation of field winding 14 is limited when the limiting temperature condition is encountered.

As the temperature of the motor temperature simulator 140 decreases, for example due to less current being supplied to traction motor 24 or to relatively cold outside temperature conditions, the resistance of temperature sensitive resistor 28 decreases with the result that the transistors 64 and 66 are biased "On" to some extent. This means that more bias current can be supplied to control coils 70 with the further result that the output voltage of bridge 82 can be increased to increase the excitation of field 14 and therefore the output voltage and power of generator 10. The transistors 64 and 66 operate in a modulating mode so that the bias to transistor 73 is smoothly varied over a predetermined temperature range sensed by resistor 28 to therefore provide one factor in determining the field excitation and output power of the generator 10. In this regard it will of course be appreciated that adjustment of the load regulator rheostat 85 sets a power lever for the generator 10 and transistor 73 is conductive as long as its base voltage exceeds its emitter voltage to therefore cause current to be supplied to control winding 70. The conduction of transistor 73 is therefore determined by the relative voltages at arm 85A and the voltage of junction 77. The voltage at junction 77 is determined by current feedback and also by the temperature attained by the temperature simulator 140. This means that when the temperature of the temperature simulator is below a limiting value the excitation of the field winding 14 can be increased to a higher value than a condition where the temperature simulator reaches a limiting value. This is determined by the potential at junction 77 which is varied as the conduction of transistors 64 and 66 vary to thereby provide a temperature control parameter to the excitation of field winding 14. It should be pointed out that the emitter of transistor 73 can also be supplied with a bias voltage which is a function of the output voltage of generator 10. This can be accomplished by sensing the output voltage of the output winding 12 with transformers which feed a bridge rectifier which provides a direct voltage that is a function of the output voltage of the output winding 12. In any event, for purposes of this invention, the field excitation is controlled and limited as a function of the temperature sensed by the resistor 28 and other control schemes could be utilized to perform this function.

It will, of course, be appreciated that the generator 10 and the generator 80 are both driven by a suitable prime mover on a locomotive such as a diesel engine which has not been illustrated.

What is claimed is:

1. A temperature simulator and detector adapted to be connected in series with a series direct current traction motor for simulating and detecting the temperature of the interior of said traction motor comprising, first and second spaced metallic blocks each formed of a heat and electrically conductive material and adapted to be connected with conductor means, each of said blocks having ledge portions of reduced thickness, a flat strip of electric resistance material secured to said ledge portions of said blocks to connect said blocks and forming an electrical heater, and a temperature detector comprising a metallic base engaging one of said ledge portions for detecting the temperature of said simulator when traction motor current is passed through said heater.

* * * * *

PO-1050
(5/69)

UNITED STATES PATENT OFFICE
CERTIFICATE OF CORRECTION

Patent No. 3,691,446　　　　　　　　Dated September 12, 1972

Inventor(s) Max Ephraim, Jr. and Earl D. Smith

It is certified that error appears in the above-identified patent and that said Letters Patent are hereby corrected as shown below:

Column 4, line 52, delete "valves" and substitute -- values --
　　　　　　line 63, after "94" insert -- and --.

Column 5, line 46, after "66" insert -- nonconductive the conduction of transistor 73 will be controlled such that a minimum amount of conductance for transistor 73 is due to temperature control. Between the value of resistance 28, which causes non-conduction of transistors 64 and 66 --.

Signed and sealed this 29th day of May 1973.

(SEAL)
Attest:

EDWARD M. FLETCHER, JR.　　　　　　ROBERT GOTTSCHALK
Attesting Officer　　　　　　　　　　Commissioner of Patents